United States Patent [19]

Erickson

[11] 4,270,824
[45] Jun. 2, 1981

[54] ELECTRICAL CLAMP

[75] Inventor: Milton W. Erickson, Crete, Ill.

[73] Assignee: Dover Corporation, New York, N.Y.

[21] Appl. No.: 25,569

[22] Filed: Mar. 30, 1979

[51] Int. Cl.³ .............................................. H01R 4/50
[52] U.S. Cl. .................................. 339/15; 339/268 S; 339/270 R; 339/273 R
[58] Field of Search ................... 339/15, 16, 268, 247, 339/270 R, 273, 274

[56] References Cited

U.S. PATENT DOCUMENTS

| | | | |
|---|---|---|---|
| 1,039,542 | 9/1912 | Kennington | 339/268 S |
| 1,301,827 | 4/1919 | Flye | 339/268 |
| 1,696,568 | 12/1928 | Fogel | 339/268 S |

FOREIGN PATENT DOCUMENTS

| | | | |
|---|---|---|---|
| 1061859 | 7/1959 | Fed. Rep. of Germany | 339/273 R |
| 376267 | 8/1907 | France | 339/268 R |
| 458800 | 7/1950 | Italy | 339/268 |
| 337549 | 11/1930 | United Kingdom | 339/268 S |

OTHER PUBLICATIONS

Tweco MIG-Gun Installation; Form No. MGM-12R; 9-15-73.
400 Ampere Tweco MIG Gun; Catalog No. MG 400-76; 12-15-76.
Model No. 1, "Tweco Lite"; Catalog No. MG 100-78; 4-1-78.
MIG Welding Guns; Binzel Catalog No. 41-78, 4-1-78.
Binzel Catalogs: BA 15K-76-1; BA 30K-76-1; BA 40-76-1; BA 60-76-1; BA 500/600-76-1; "MIG Welding Guns".
Binzel Form No. WFA-78.
OSU-Schnellanschluss-Sichensheitssysstem.
OSU: Schutzgas Schweisspistolen EMSG.
"Tweco Cone Nut-End Fitting Assembly", 1-12-79.

*Primary Examiner*—John McQuade
*Attorney, Agent, or Firm*—Hume, Clement, Brinks, Willian & Olds, Ltd.

[57] ABSTRACT

An improved arc welding gun includes a quick connect connector, a differential taper cable clamp and an easily operated trigger locking assembly. The quick connect connector includes a current contacting pin which fits within a mating sleeve. The sleeve is provided with a pair of axial slits and is spring biased to firmly grip the contacting pin to provide a low resistance connection. Preferably, the connector is held together by a locking sleeve which can be either connected or disconnected with a fractional rotation of the locking ring. The cable clamp includes two clamping members which fit together to clamp the power conductors of a cable between inner and outer clamping surfaces. The inner and outer clamping surfaces are both conical and are provided with different tapers such that a narrow throat region is formed between the two clamping surfaces near the cable end of the clamp. This differential taper provides a low resistance and a secure grip on the power conductors. The locking trigger assembly includes a slideably mounted locking crescent which has one end situated near a finger surface of the trigger assembly. Pressure on this end of the crescent simultaneously pivots the trigger and locks the trigger in the pivoted position.

16 Claims, 13 Drawing Figures

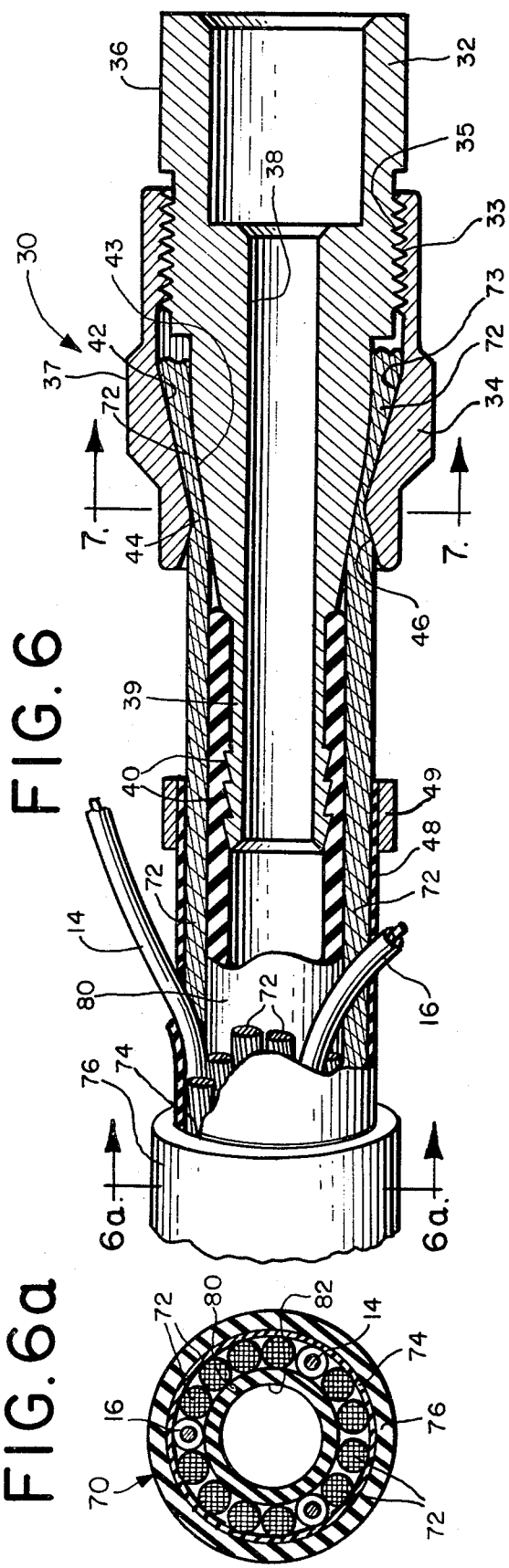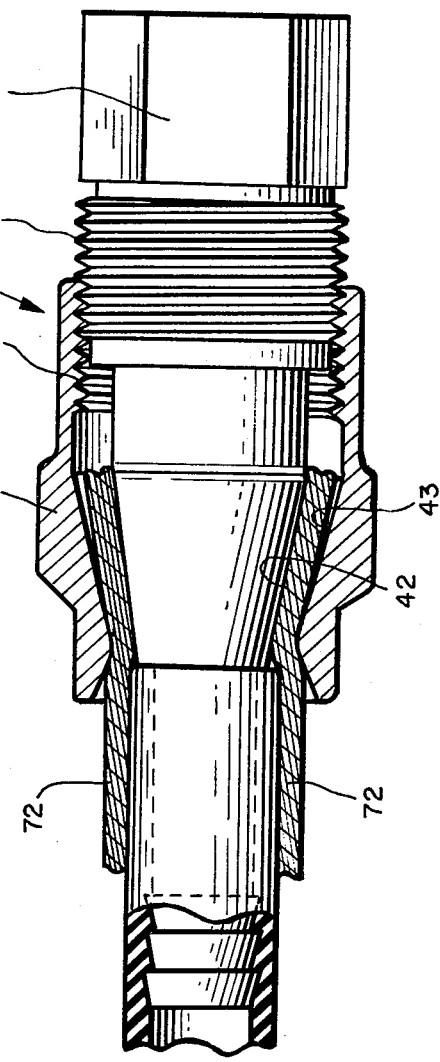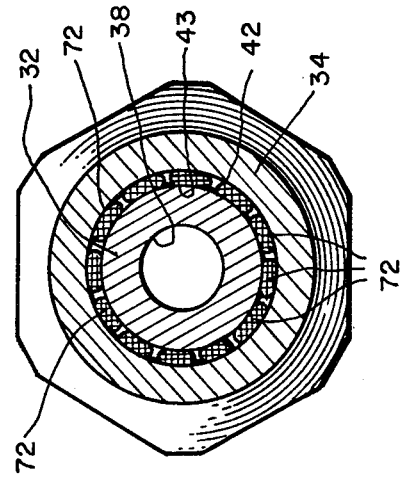

ELECTRICAL CLAMP

BACKGROUND OF THE INVENTION

This invention relates to an improved arc welding gun and particularly to improved, cable clamps for such welding guns.

This invention is well suited for arc welding guns employing continuous feed, consumable electrodes. Although originally developed for welding guns which use a shielding gas from a separate source, the improvement of this invention are equally valuable when used in other types of welding guns, such as guns used in welding operations in which the electrode conveys material to the welding arc which generates a shielding medium at the arc or in submerged arc welding operations.

SUMMARY OF THE INVENTION

According to this invention an improved cable clamp is provided for securing an end section of an electrical cable. The cable clamp of this invention includes outer and inner clamping members which define outer and inner clamping surfaces, respectively. Both clamping surfaces are tapered, with the angle of convergence of the outer clamping surface being greater than that of the inner surface. Preferably, both clamping surfaces are formed in the shape of truncated cones and are arranged coaxially. In use, power conductors of the cable are placed between the two clamping surfaces, which are then clamped together, thereby pinching the cable conductors between the two clamping surfaces. Because the angle of convergence of the outer clamping surface is greater than that of the inner, a region of minimum separation between the two clamping surfaces is formed near the cable end of the clamp. The clamping force is principally applied to the cable conductors at this point.

The differential taper between the two clamping surfaces in the clamp of this invention provides several advantages over parallel taper cable clamps of the prior art. First, the differential taper creates an annular region in which the applied clamping force is focused on the power conductors of the cable. By focusing the clamping force on a small area of the conductors, high clamping pressures may be obtained. This focusing effect results in a low resistance connection between the cable and the clamp, which is of major importance in clamps which pass high currents. A second advantage is that the clamp of this invention provides a restricted throat region through which the power conductors pass. This narrow throat substantially prevents the cable from pulling out of the clamp. Thus, the clamp of this invention provides a secure cable connection. A third advantage is that this clamp eliminates the need for set screws to hold the cable in the clamp. Set screws have been known to loosen in use, and the elimination of set screws reduces the maintenance and adjustment required by the gun.

The clamp of this invention can be used at both ends of a welding gun cable to connect the cable at one end to an arc welding gun and at the other end to a source of electric current. In use, the low resistance contact provided by this clamp contributes to cool operation of the welding gun.

Also disclosed is an arc welding gun provided with a modular trigger assembly which is pivotably mounted on the gun. This trigger assembly also includes a locking member slideably mounted in the trigger. This locking member is arranged such that the trigger can simultaneously be depressed and locked in the depressed position by depressing only the locking member. This arrangement is simple to use, for an operator is not required to depress two separate elements to lock the trigger, as with some welding guns of the prior art. Instead, the single motion of pressing the locking member performs both functions. Furthermore, the locking member can be released simply by momentarily depressing the trigger after the locking member has been set. Thus, no pulling motions and no coordinated manipulation of two or more elements are needed to either set or release the trigger.

The invention, together with further objects and attendant advantages, will be best understood by reference to the following description taken in connection with the accompanying drawings.

BRIEF DESCRIPTION OF THE DRAWINGS

FIG. 1a is a cross-sectional view taken along line 1a—1a of FIG. 1.

FIG. 6 is a cross-sectional view of the cable clamp of FIG. 1 showing the clamp as installed on the cable.

FIG. 6a is a cross-sectional view of the cable taken along line 6a—6a of FIG. 6.

FIG. 7 is a cross-sectional view of the clamp taken along line 7—7 of FIG. 6.

FIG. 8 is a cross-sectional view showing an intermediate stage in the installation of the clamp of FIG. 6.

DETAILED DESCRIPTION OF PREFERRED EMBODIMENTS

Figure 1:
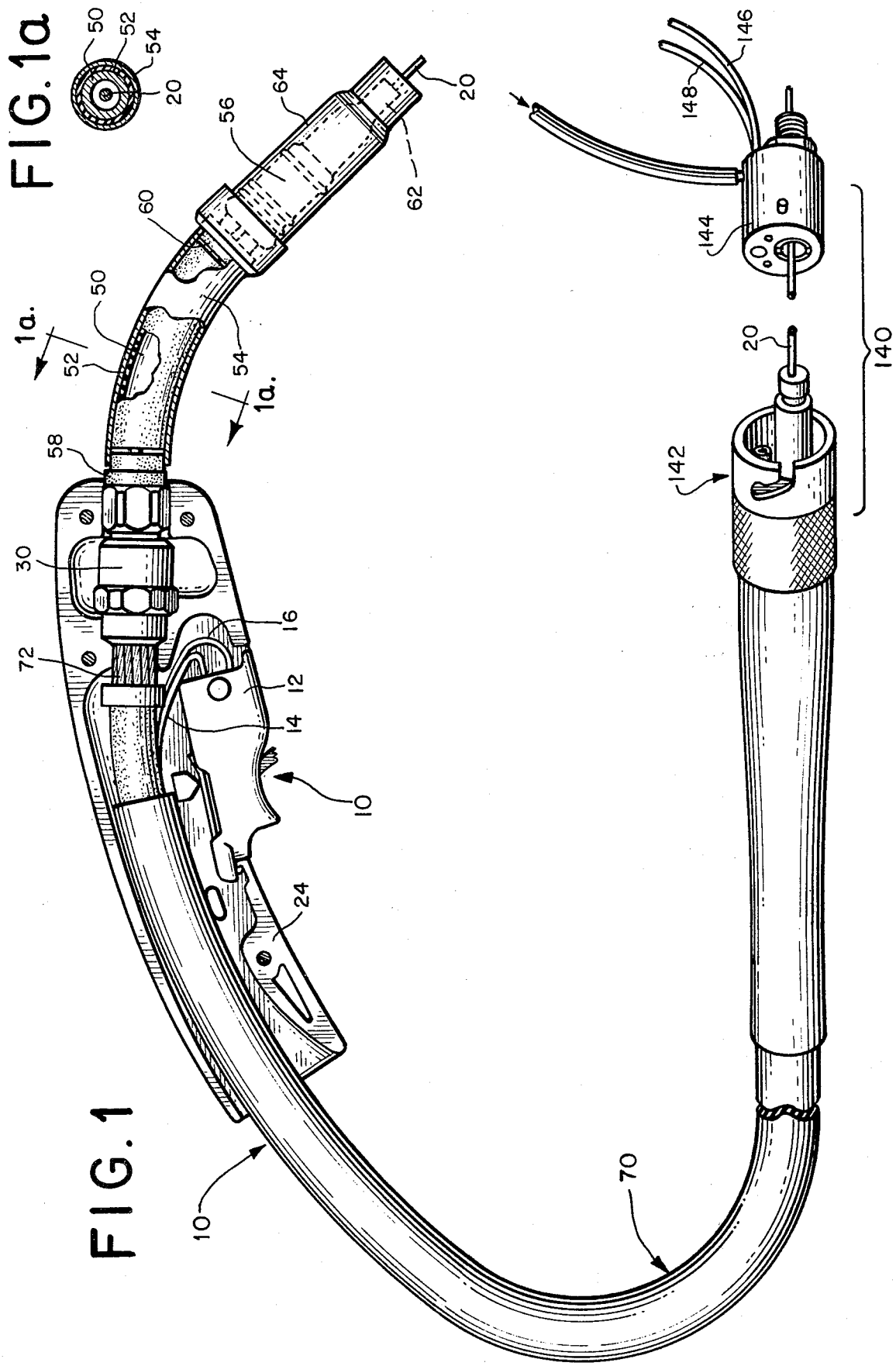
FIG. 1 is a side view in partial cutaway of an arc welding gun including a preferred embodiment of the cable clamp of this invention.
Figure 2:
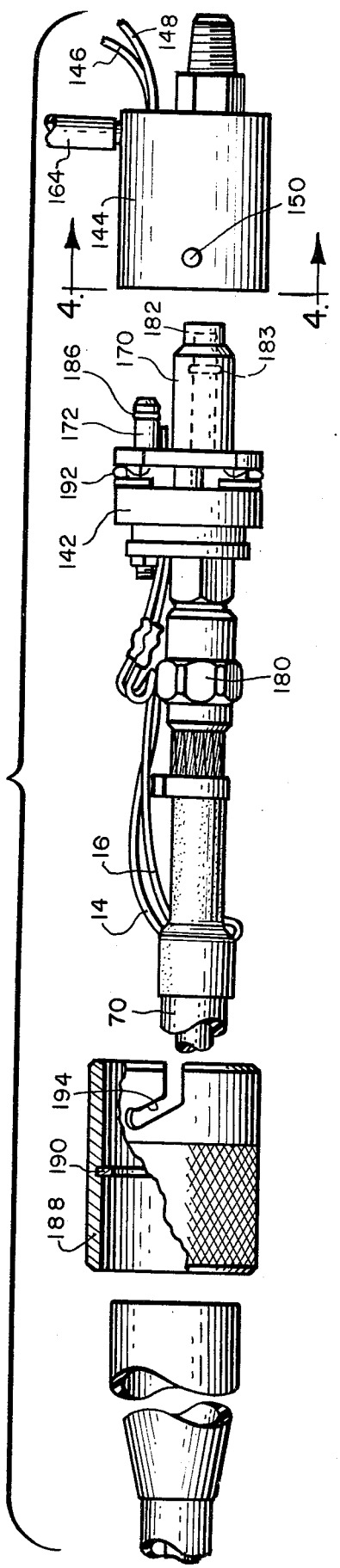
FIG. 2 is an exploded view of the quick connect connector of FIG. 1.

Referring now to the drawings, FIG. 1 represents an arc welding gun 10 which is coupled to a quick connect connector 140 by means of a cable 70.

In general terms the cable 70 serves to pass continuous lengths of consumable electrode 20, shielding gas, and welding current from the quick connect connector 140 to the welding gun 10. The quick connect connector 140 comprises a connector body 142 and a connector socket 144, and in use the socket 144 is coupled to a conventional source of continuous lengths of electrode, such as a wire feeder unit (not shown) and to conventional sources of shielding gas and welding current. Also, a pair of control leads 146,148 for controlling the wire feeder unit (not shown) is coupled to the socket 144. These control leads 146,148 are connected by the connector 140 to a pair of control conductors 14,16 in the cable 70. The conductors 14,16 are switched at the switch assembly 12 by the gun operator to control feeding of the electrode 20 to the gun 10.

The welding gun 10 in FIG. 1 includes an insulating handle 24, a cable clamp 30, a gooseneck 50, and a head assembly 56, in addition to the trigger assembly 12. As shown in FIG. 1, one half of the handle 24 has been removed to show the internal components of the gun 10. In use, the handle 24 would be assembled to completely enclose the internal parts of the gun 10 to protect the operator from exposure to welding current and associated heat. Preferably, the handle 24 is formed from a rugged insulating plastic in two halves which are reversably fastened together.

The cable clamp 30 will be described in greater detail in connection with FIGS. 6-8. In functional terms, the clamp 30 serves to secure the cable 70 in the gun 10 by firmly gripping the power conductors of the cable 70. The clamp 30 is securely connected to the gooseneck 50, by means of silver solder, for example, and serves to conduct welding current from the power conductors to the gooseneck 50.

The gooseneck 50 is a curved sleeve connected at one end to the clamp 30 and at the other end to the head assembly 56. The gooseneck 50, which is insulated by a silicone sleeve 52, is protected by an armor sleeve 54 which is held in place by insulating rings 58,60.

The head assembly 56 conducts the welding current to a replaceable contact tip 62, which is preferably a locking contact tip as disclosed in U.S. Pat. No. 3,514,570. The contact tip 62 conducts welding current to the electrode 20 in the conventional manner. A gas nozzle 64 surrounds the contact tip 62 and conducts shielding gas to the welding arc.

Thus, the welding gun 10 conducts both shielding gas and welding current from the cable 70 through the clamp 30, the gooseneck 50, and the head aseembly 56 to the region of the arc.

THE QUICK CONNECT CONNECTOR

Proceeding now to a more detailed description of components embodying particular features of the invention, the quick connect connector 140 is shown in greater detail in FIGS. 2 through 5. As previously mentioned, the connector 140 includes a connector body 142 and a socket 144. The socket 144 is a generally cylindrical body formed from a heat resistant, insulating material such as a phenolic. A pair of locking pins 150,152 are mounted in the socket to extend outwardly along radial lines from the sides of the socket 144. Four bores 154,156,158,160 are formed in one end of the socket 144. Bore 154, which is the largest of the bores, is provided with a brass current contacting sleeve 162. This contacting sleeve is provided with an axial bore 164 through which the electrode 20 is passed. Two opposed axial slits formed in the contacting sleeve 162 permit the contacting sleeve 162 limited radial expansion. Bore 156 is coupled by a hose 164 to a source of a shielding gas such as carbon dioxide. Bore 158 and 160 are provided with connector sleeves which are connected to control leads 146,148, respectively.

The connctor body 142 includes four pins 170,172,174,176 positioned to fit within the four bores 154,156,158,160, respectively. Pin 170 is a current contacting pin made of an electrically conducting material such as brass, and is sized to fit within the contacting sleeve 162 in a sliding press fit. In the presently preferred embodiment the outer diameter of pin 170 is 0.750 inches and the machined internal diameter of the sleeve 162 is 0.748 inches. In order to increase the spring force with which the sleeve 162 grips the pin 170, the sleeve is crimped after the sleeve 162 has been formed to reduce the dimension designated X in FIG. 4 to 0.735 inches. The pin 170 is chamfered to spread the sleeve 162 on insertion.

The pin 170 is held in place to the connector body 142 by a snap ring 198 and is secured to one end of a cable clamp 180, which in turn is secured to one end of the cable 70. The clamp 180 provides both a secure mechanical connection between the connector body 142 and the cable 70, and a low resistance electrical connection between the power conductors of the cable 70 and the current contacting pin 170. Control conductors 14,16 of the cable 70 bypass the clamp 180 and are secured to pins 174,176, respectively. Preferably, the clamp 180 is similar to the clamp 30 described below in connection with FIGS. 6-8.

The contacting pin 170 is provided with an axial bore which aligns with the bore 164 in the sleeve 162. A retaining plug 182 is sized to fit within the bore in the pin 170. This retaining plug 182 is connected to a conventional spiral wire electrode liner which forms a guide for the axially positioned electrode 20. The retaining plug is provided with an elastomeric O-ring 183 which frictionally engages the bore in the pin 170 to hold the liner in place without set screws or other adjustment members. The liner pases through a central bore in the clamp 180, the cable 70, and the clamp 30 to the gooseneck 50.

The gas pin 172 is mounted in the body 142 and is provided with an elastomeric O-ring seal 186 which forms a gas-tight seal between the bore 156 and the gas pin 172. The gas pin 172 is hollow and communicates via an oblique passageway (not shown) in the body 142 with the axial bore in the pin 170. Shielding gas passes from the hose 164, through the bore 156 into the gas pin 172 and from there into the axial bore which extends through the clamp 180 into the cable 70 to the welding gun 10.

Figure 3:
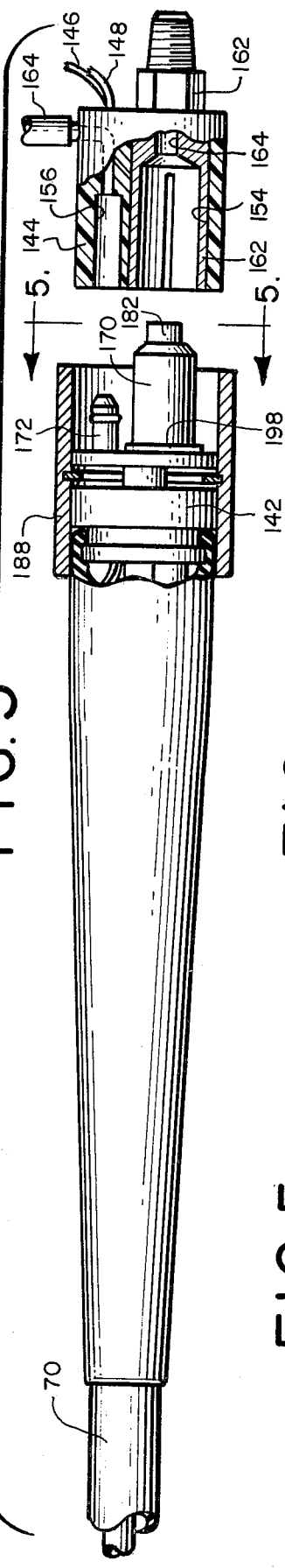
FIG. 3 is a side view in partial cutaway of the quick connect connector of FIG. 1.
Figure 4:
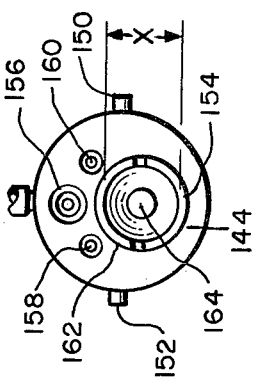
FIG. 4 is an end view of the quick connect connector socket taken along line 4—4 of FIG. 2.
Figure 5:
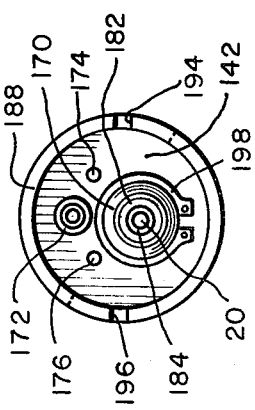
FIG. 5 is an end view of the quick connect connector body taken along line 5—5 of FIG. 3.

The connector body 142 is held in place adjacent the connector socket 144 by a locking sleeve 188 which is rotatably mounted on the body 142 by means of a snap ring 190 which is positioned in matching grooves in the locking sleeve 188 and the connector body 142. A spring washer 192 biases the locking sleeve 188 toward the cable clamp 180. The locking sleeve 188 defines two opposed recesses or cutouts 194,196 oriented as shown to engage the locking pins 150,152, respectively, to lock the connector body 142 to the socket 144. Only a small fraction of a rotation is required to lock or unlock the locking sleeve, and the spring force provided by the spring washer 192 holds the sleeve 188 in place. As best shown in FIG. 3, the locking sleeve 188 extends over the gas pin 172 and the control signal pins 174,176, protecting them from accidental impact.

The quick connect connector shown in FIGS. 2-5 provides low resistance electrical connection and low temperature operation. All necessary connections are made in a single mating of the connector body 142 with the socket 144, and a fractional rotation of the locking sleeve 188 holds the connector together. The split sleeve 162 provides a positive contacting force against the pin 170, and, therefore, the locking sleeve 188 need only provide a moderate holding force to ensure low resistance connection and cool operation. The gas pin 172 and the contacting pin 170 are eccentrically mounted so that proper alignment is ensured.

THE CABLE CLAMP

Turning now to FIGS. 6-8, a preferred embodiment of the cable clamp 30 is shown in cross section. As a preliminary matter, it should be noted that the cable 70 (shown in cross-section in FIG. 6a) is a complex structure made up of several coaxial layers. The innermost layer is a flexible tube 80 which defines a bore 82 sized to receive the electrode liner and electrode (not shown in this view) and to conduct shielding gas to the welding gun. Immediately outside the tube 80 is a layer of wire strands including insulated control leads 14,16 and a plurality of heavy copper power conductors 72. These wire strands 14,16,72 extend the length of the cable 70. A layer of thin mylar tape 74 is wound around the wire strands 14,16,72 to hold them firmly in position around the tube 80. Finally, an abrasion resistant, electrically insulating sheath of neoprene 76 encircles the entire assembly to provide a wear-resistant exterior surface.

FIG. 6 is a cross-sectional view of the clamp 30 installed on the cable 70. The clamp 30 comprises an inner clamping member 32 and an outer clamping member 34 which are held together by mating threads 33,35. The inner and outer clamping members 32,34 are provided with wrench flats 36,37 used to torque the two clamping members together. The inner clamping member 32 includes a tubular shaft 39 which defines external sawtooth shaped gas sealing rings 40 which provide a gas seal between the inner clamping member 32 and the cable tube 80 to prevent leakage of shielding gas out of the clamp 30. The inner clamping member also defines a central bore 38 which aligns with the central bore 82 of the cable 70 and serves as a passageway for sheilding gas, the electrode, and the electrode liner through the clamp 30.

The clamp 30 is held in place on the cable 70 by opposed clamping surfaces 43,42 defined by the inner and outer clamping members 32,34, respectively. The annular volume between the two clamping surfaces includes an end region 73 near the threads 33,35 and a throat region 44 near the cable end of the connector 30. In the presently preferred embodiment, both the inner clamping surface 43 and the outer clamping surface 42 are tapered and are formed in the shape of truncated cones. The angle of convergence (defined as the angle between the clamping surface and the axis of the clamp) for the outer clamping surface 42 is greater than the angle of convergence of the inner clamping surface 43, so that the two clamping surfaces 42,43 converge to an annular throat region 44 of minimum separation. In the presently preferred embodiment, the angle of convergence of the inner and outer clamping surfaces is 10° and 15°, respectively.

When the clamp 30 is installed, as shown in FIG. 6, the separation between the inner and outer clamping surfaces 43,42 in the throat region 44 is less than the diameter of the power conductors 72. The clamping force supplied by the mating threads 33,35 is focused on an annular region in the vicinity of the throat region 44, where it deforms the power conductors 72, as shown in FIG. 7. The outer clamping member 34 is provided with a flared skirt 46 which reduces the tendency of the clamp 30 to cut or sever the power conductors 72.

The localized pinching of the power conductors 72 provides two important advantages. First, it ensures that a high clamping pressure against the power conductors 72 and, therefore, good electrical contact. Since the available clamping force is focused on a relatively small surface area of the power conductors 72, clamping pressures are higher than if the clamping force were evenly distributed over the clamping surfaces 42,43. Second, the restricted throat region ensures that the clamp 30 is securely fastened to the cable 70. Because the power conductors 72 are deformed and flattened in the throat region 44 and the throat region is smaller in cross section than the end region 73, the cable cannot be pulled out of the installed clamp 30 without extruding the ends of the power conductors 72 through the throat region 44.

The clamp 30 is installed by first preparing an end of the cable 70. The outer neoprene sheath 76 and mylar tape 74 are removed from a portion of the cable 70, and the control leads 12,14 are separated from the power conductors 72. The inner tube 80 is cut shorter than the power conductors 72, and then the power conductors are bound in place by a heat shrinkable polyolefin tubing 48. The outer clamping member 34 is then slipped over the end of the cable 70 and the inner clamping member 32 is inserted into the cable with the tubular shaft 39 extending into the cable bore 82. The outer clamping member 34 is then screwed onto the inner clamping member 32 and torqued into place. FIG. 8 shows the clamp 30 at an intermediate stage of installation with the outer clamping member 34 partially threaded onto the inner clamping member 34. As the two clamping members 32,34 are threaded together, the clamping surfaces 42,43 gradually converge and the throat region 44 is formed to secure the clamp 30 to the cable 70. A hose clamp 49 is then applied to seal the cable tube 80 against the gas sealing rings 40. The clamp 30 has been described for use in a welding gun 10, but it should be understood that the presently preferred embodiment of the quick connect connector 140 utilizes a similar cable clamp for the clamp 180.

THE TRIGGER ASSEMBLY

Figure 9:
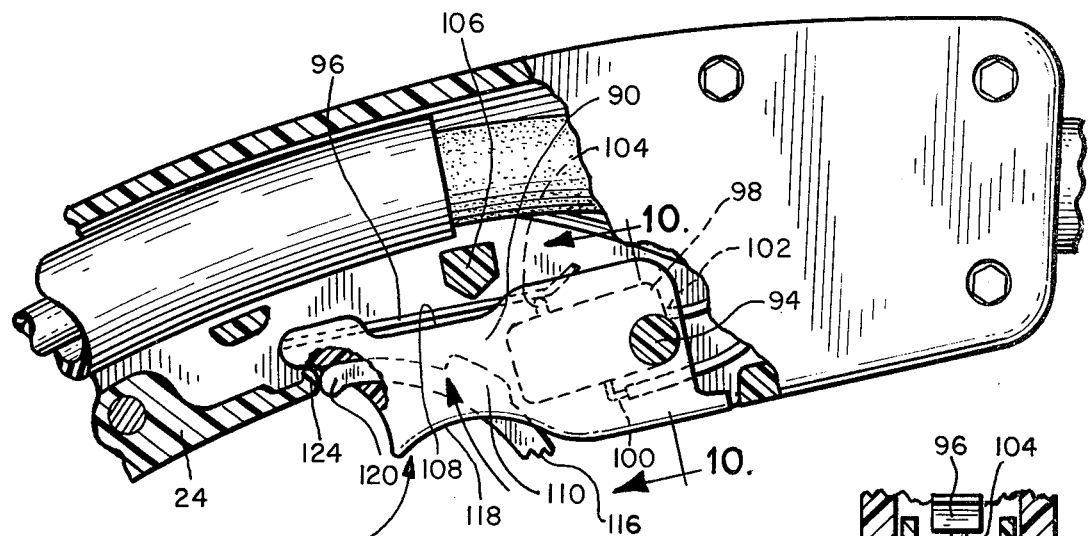
FIG. 9 is a detail view of the trigger assembly of FIG. 1.
Figure 10:
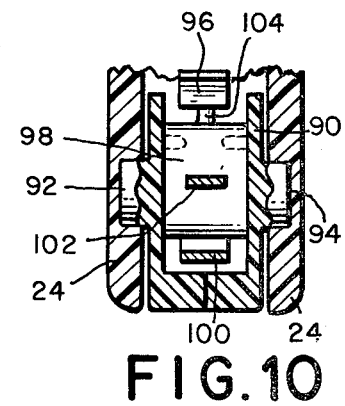
FIG. 10 is a sectional view taken along line 10—10 of FIG. 9.
Figure 11:
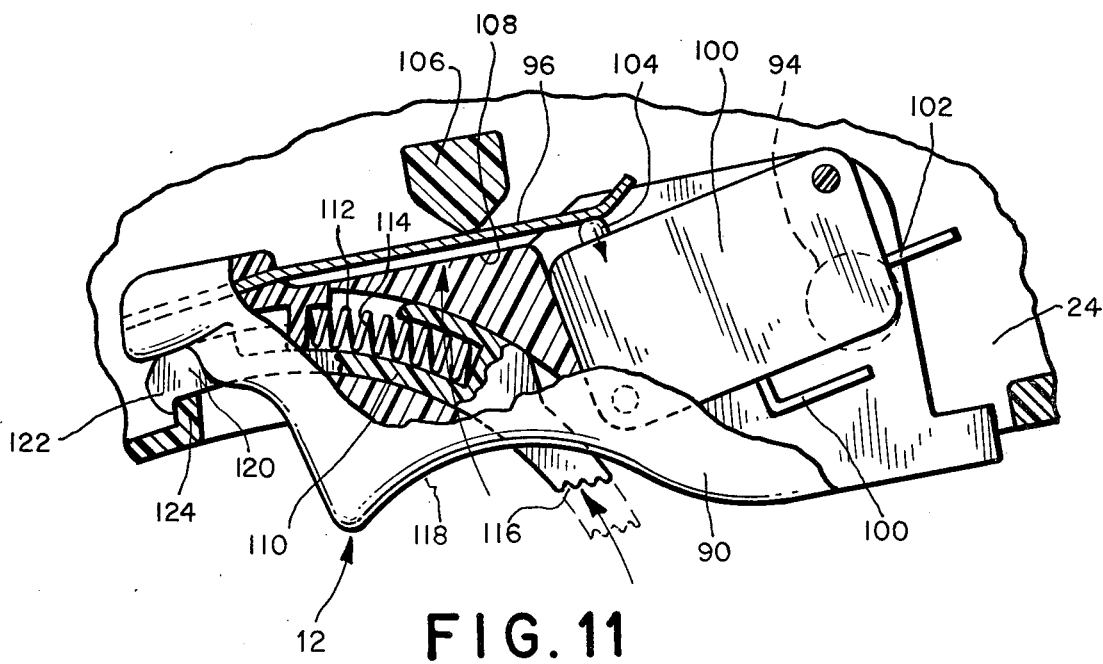
FIG. 11 is a detail view of the trigger assembly of FIG. 1 showing the trigger locked in the down position.

The trigger assembly 12 is shown generally in FIG. 1 and in greaer detail in FIGS. 9-11. The trigger assembly 12 includes a trigger housing 90 molded from a heat resistant, insulating plastic material. The housing 90 defines two trigger pivots 92,94 which are sized to fit within matching trigger sockets formed in the welding gun handle 24. The trigger pivots 92,94 pivotably mount the trigger assembly 12 to the handle 24.

Mounted in the trigger housing 90 are a leaf spring 96 and a sealed two position switch 98 having a pair of terminals 100,102 and an actuating button 104. The switch 98 operates to connect and disconnect the terminals 100,102 depending on the position of the actuating button 104. As installed in the welding gun 10, the switch terminals 100,102 are connected to the control leads 12,14, and the switch operates to control the feeding of the electrode 20 to the gun 10.

The leaf spring 96 bears on a contact surface 106 formed in the handle 24 and simultaneously acts to bias the trigger assembly 12 away from the handle 24 and to contact the actuating button 104. One advantage of this arrangement is an economy of parts. A second advantage is that the switch 98 is protected from excessive switching forces; the housing 90 defines a surface 108 which limits the range of travel of the spring 96 to protect the switch 98 from over travel of the trigger assembly.

The elements described above provide a self-contained, modular switching assembly which is well suited for use in welding guns where momentary trigger actuation is required. Some applications, however, require a trigger which can be locked in position, and for these applications, a spring loaded locking crescent 110 is provided.

This locking crescent 110 is slideably mounted in a curved groove 112 formed in the trigger housing 90 and is spring biased by a coil spring 114 into the position shown in FIG. 9. The locking crescent 110 defines a first end section 116 adjacent the finger surface 118 of the housing 90. This end section 116 is preferably serrated to provide a slip free surface. The other end section 120 is provided with a lip 122 sized to engage a mating lip 124 formed in the housing 24.

In operation the locking crescent 110 allows an operator to either lock the trigger down or release the trigger from its locked position with a single squeeze of the trigger assembly 12. When pressure is applied to the serrated end section 116 of the locking crescent 110, the pressure pivots the trigger housing 90 and actuates the switch 98. Simultaneously, this pressure slides the locking crescent 110 from the position shown in FIG. 9 to that shown in FIG. 11, where the lip 122 on the locking crescent 110 engages the lip 124 on the handle 24 to lock the trigger housing 90 in the down position. Once the trigger housing 90 is locked down, momentary pressure on the finger surface 118 disengages the locking crescent 110 from the lip 124, and the spring 114 then returns the locking crescent 110 to the position shown in FIG. 9. This unlocks the trigger housing 90.

Thus, it can be seen that the trigger assembly 12 can be locked or unlocked by momentary pressure. The operator is not required to manipulate more than one element to lock the trigger, nor is any pulling action required. This trigger assembly 12 can be conveniently locked and unlocked by a gloved operator and it is, therefore, well suited for use in welding guns.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A clamp for securing the end section of an electrical cable, said clamp comprising:
   an inner clamping member defining a tapered inner clamping surface;
   an annular outer clamping member defining a tapered outer clamping surface sized to telescope over the inner clamping surface, said outer clamping surface having a greater angle of convergence than said inner clamping surface; and
   means for securing the inner clamping member to the outer clamping member such that the outer clamping surface is secured near the inner clamping surface to create an annular space therebetween for receiving and clamping the end section of an electrical cable, said annular space having a throat region and an end region wherein the end region is nearer the end of the cable than the throat region when the clamp is secured to the cable, and the annular space defines a smaller cross sectional area at the throat region than the end region.

2. The clamp of claim 1 wherein the securing means includes mating threads formed on adjacent surfaces of the inner clamping member and the outer clamping member.

3. The clamp of claim 1 wherein both the inner and outer clamping surfaces are formed in the shape of truncated cones.

4. The clamp of claim 1 wherein the inner clamping member is provided with an axial bore which passes through the inner clamping surface to receive an electrode liner.

5. The clamp of claim 4 wherein the inner clamping member includes a tubular projection aligned with the bore extending out from the inner clamping surface, said projection sized to fit within the cable.

6. The clamp of claim 5 wherein the projection includes a plurality of gas sealing rings.

7. A clamp for securing one end of an arc welding cable, said cable including a central bore and a plurality of electrical conductors arranged around the bore, said clamp comprising:
   an inner member having a tapered inner clamping surface and a central opening positioned to align with the central bore of the cable;
   an outer member having a central opening sized to receive the cable and a tapered outer clamping surface formed in the central opening, said inner and outer members cooperating to define a tapered annular region between the inner and outer clamping surfaces for receiving and clamping end portions of said plurality of conductors, said annular region defining a throat section and an end section wherein the end section is nearer than the throat section to the end portions of the conductors when the clamp is secured to the cable and the cross sectional area of the throat section is less than that of the end section; and
   means for securing the inner member to the outer member such that said plurality of conductors are clamped therebetween in the annular region.

8. The clamp of claim 7 wherein both the inner and outer clamping surfaces are substantially conical in shape and the angle of convergence of the outer clamping surface is greater than that of the inner clamping surface.

9. In a clamp for an electrical cable having a plurality of conductors, said clamp including inner and outer mateable elements which cooperate to clamp the plurality of conductors between inner and outer concentric tapered clamping surfaces, the improvement comprising:
   a differential taper on the inner and outer tapered clamping surfaces such that at least a portion of said inner clamping surface converges toward said outer clamping surface to pinch said plurality of conductors therebetween in a throat region such that said plurality of conductors cannot be pulled from the clamp after the clamp has been secured to the cable without flattening and deforming said plurality of conductors to pass through the throat region.

10. A clamp for securing one end of an electrical cable, said cable including a central passageway sized to receive an electrode liner, said clamp comprising:
   an inner clamping member defining a tapered inner clamping surface and a co-axial inner bore sized to align with the central passageway to receive the electrode liner;
   an annular outer clamping member defining a tapered outer clamping surface sized to telescope over the inner clamping surface, said outer clamping surface having a greater angle of convergence than said inner clamping surface; and means for securing the inner clamping member to the outer clamping member such that the outer clamping surface is secured near the inner clamping surface to create an annular space therebetween for receiving and clamping the end section of an electrical cable, said annular space having a throat region and an end region wherein the end region is nearer the end of the cable than the throat region when the clamp is secured to the cable, and wherein the annular space defines a smaller cross sectional area at the throat region than the end region.

11. The clamp of claim 10 wherein the securing means includes mating threads formed on adjacent surfaces of the inner clamping member and the outer clamping member.

12. The clamp of claim 10 wherein the inner clamping member further defines a tubular projection aligned with the inner bore, said projection sized to fit within the central passageway of the cable.

13. The clamp of claim 12 wherein the projection includes a plurality of gas sealing rings.

14. A clamp for securing one end of an arc welding cable, which cable defines a central passageway sized to receive an electrode and a plurality of electrical conductors arranged around the passageway, said clamp comprising:

an inner member having a tapered, inner clamping surface and a central opening positioned to align with the central passageway of the cable to receive the electrode;

a tubular projection secured to the inner member, aligned with the central opening and sized to fit within the central passageway around the electrode;

an outer member having a central opening sized to receive the cable and a tapered outer clamping surace formed in the central opening, said inner and outer members cooperating to define a tapered annular region between the inner and outer clamping surfaces for receiving and clamping end portions of said plurality of conductors, said annular region defining a throat section and an end section, wherein the end section is nearer than the throat section to the end portions of the conductors when the clamp is secured to the cable and the cross sectional area of the throat section is less than that of the end section; and means for securing the inner member to the outer member such that said plurality of conductors are clamped therebetween in the annular region, and the plurality of electrical conductors cannot be pulled from the clamp after the clamp has been secured to the cable without said plurality of conductors being deformed and flattened to pass through the reduced cross section of the throat section.

15. The clamp of claim 14 wherein both the inner and outer clamping surfaces are substantially conical in shape and the angle of convergence of the outer clamping surface is greater than that of the inner clamping surface.

16. The clamp of claim 14 wherein the tubular projection defines a plurality of circumferential ridges on the outer distal end thereof, which ridges effect a gas tight seal between the projection and the central passageway of the cable.

* * * * *

UNITED STATES PATENT AND TRADEMARK OFFICE
CERTIFICATE OF CORRECTION

PATENT NO. : 4,270,824
DATED : June 2, 1981
INVENTOR(S) : Milton W. Erickson

It is certified that error appears in the above—identified patent and that said Letters Patent is hereby corrected as shown below:

Column 1, line 12, delete "ment" and insert therefor
--ments--.

Column 3, line 59, delete "connctor" and insert therefor
--connector--.

Column 4, line 27, delete "pases" and insert therefor
--passes--.

Column 10, line 5, delete "surace" and insert therefor
--surface--.

Signed and Sealed this

Twentieth Day of October 1981

[SEAL]

Attest:

Attesting Officer

GERALD J. MOSSINGHOFF

Commissioner of Patents and Trademarks